(12) United States Patent
Khurana et al.

(10) Patent No.: US 8,010,509 B1
(45) Date of Patent: Aug. 30, 2011

(54) SYSTEM AND METHOD FOR VERIFYING AND CORRECTING THE CONSISTENCY OF MIRRORED DATA SETS

(75) Inventors: Varun Khurana, Santa Clara, CA (US); Prasanna Kumar Malaiyandi, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 592 days.

(21) Appl. No.: 11/478,931

(22) Filed: Jun. 30, 2006

(51) Int. Cl.
*G06F 7/00* (2006.01)
*G06F 17/00* (2006.01)

(52) U.S. Cl. .................... 707/690; 707/691; 707/697
(58) Field of Classification Search .................... 707/10, 707/201, 690, 691, 697; 714/5
See application file for complete search history.

(56) References Cited

U.S. PATENT DOCUMENTS

| | | |
|---|---|---|
| 4,570,217 A | 2/1986 | Allen et al. |
| 5,124,987 A | 6/1992 | Milligan et al. |
| 5,163,131 A | 11/1992 | Row et al. |
| 5,202,979 A | 4/1993 | Hillis et al. |
| 5,278,979 A | 1/1994 | Foster et al. |
| 5,403,667 A | 4/1995 | Simoens |
| 5,581,724 A | 12/1996 | Belsan et al. |
| 5,819,292 A | 10/1998 | Hitz et al. |
| 6,061,770 A | 5/2000 | Franklin |
| 6,081,875 A | 6/2000 | Clifton et al. |
| 6,341,341 B1 | 1/2002 | Grummon et al. |
| 6,480,970 B1 * | 11/2002 | DeKoning et al. ................ 714/6 |
| 6,745,303 B2 * | 6/2004 | Watanabe ..................... 711/161 |
| 7,117,323 B1 * | 10/2006 | Delaney ........................ 711/162 |
| 7,127,577 B2 | 10/2006 | Koning et al. |
| 7,337,194 B2 * | 2/2008 | Goyal ........................... 707/200 |
| 2002/0083037 A1 | 6/2002 | Lewis et al. |
| 2003/0158873 A1 * | 8/2003 | Sawdon et al. ............... 707/204 |
| 2003/0159007 A1 * | 8/2003 | Sawdon et al. ............... 711/154 |
| 2004/0030668 A1 | 2/2004 | Pawlowski et al. |
| 2005/0144202 A1 * | 6/2005 | Chen ............................ 707/205 |
| 2007/0088754 A1 * | 4/2007 | Brannon et al. ............. 707/200 |

OTHER PUBLICATIONS

Akyurek, Sedat, *Placing Replicated Data to Reduce Seek Delays*, De-partment of Computer Science, University of Maryland, UMIACS-TR-91-121, CS-TR-2746, Aug. 1991.
Bitton, Dina, *Disk Shadowing*, Proceedings of the 14$^{th}$ VLDB Conference, LA, CA 1988.
Chaudhuri, Surajit, et al., *Self-Tuning Technology in Microsoft SQL Server*, Data Engineering Journal 22, Feb. 1999 pp. 20-27.
Chutani, Sailesh, et al., *The Episode File System*, In Proceedings of the USENIX Winter 1992.
Coyne, Robert A., et al., *Storage Systems for National Information Assets*, Proc. Supercomputing 92, Minneapolis, Nov. 1992, pp. 626-633.
Finlayson, Ross S., et al., *Log Files: An Extended File Service Exploiting Write-Once Storage* Department of Computer Science, Stanford University, Report No. STAN-CS-87/1177, Sep. 1987.
Gray, Jim, et al., *The Recovery Manager of the System R Database Manager*, ACM Computing Surveys, (13)2:223-242 1981.

(Continued)

*Primary Examiner* — Apu M Mofiz
*Assistant Examiner* — Jared M Bibbee
(74) *Attorney, Agent, or Firm* — Cesari and McKenna, LLP

(57) ABSTRACT

A system and method verifies and repairs mirrored data sets. Verification modules executing on both the source and destination computers cooperate to identify a common persistent consistency point image (PCPI) of the source and destination data sets. Once the common image has been identified, the source sends a data stream comprising the data from the source data set to the destination to be compared with the destination data set.

37 Claims, 10 Drawing Sheets

OTHER PUBLICATIONS

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, Feb. 1999 pp. 33-40.

Kent, Jack et al., *Optimizing Shadow Recovery Algorithms*, IEEE Transactions on Software Engineering, 14( 2): 155-168 , Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached Worm File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges In Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

\* cited by examiner

SYSTEM AND METHOD FOR VERIFYING AND CORRECTING THE CONSISTENCY OF MIRRORED DATA SETS

FIELD OF THE INVENTION

This invention relates to storage systems and more particularly to verifying and correcting the consistency of mirrored data sets on storage systems.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage operating system may further implement a storage module, such as a RAID system, that manages the storage and retrieval of the information to and from the disks in accordance with input/output (I/O) operations. The RAID system is also responsible for parity operations in the storage system. Note that the file system only "sees" the data disks within its vbn space; the parity disks are "hidden" from the file system and, thus, are only visible to the RAID system. The RAID system typically organizes the RAID groups into one large "physical" disk (i.e., a physical volume), such that the disk blocks are concatenated across all disks of all RAID groups. The logical volume maintained by the file system is then "disposed over" (spread over) the physical volume maintained by the RAID system.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

In order to improve reliability and facilitate disaster recovery in the event of a failure of a storage system, its associated disks or some portion of the storage infrastructure, it is common to mirror (or replicate) a data set comprising some or all of the underlying data and/or the file system that organizes the data. A data set comprises an area of defined storage which may have a mirroring relationship associated therewith. Examples of data sets include, e.g., a file system, a volume or a persistent consistency point image (PCPI), described further below.

In one example, a mirror is established and stored at a destination storage system, making it more likely that recovery is possible in the event of a true disaster (e.g. a flood, power outage, act of war, etc.) that may physically damage a source storage system location or its infrastructure. The mirror is updated at regular intervals, typically set by an administrator, in an effort to maintain the most recent changes to the file system on the destination storage system. That is, the storage systems cooperate to ensure that the mirror is consistent, i.e., that the mirror on the destination storage system contains identical data to that of the source storage system.

One common form of update involves the use of a "snapshot" process in which an active file system at the source storage system, consisting of inodes and blocks, is captured and the changes between two snapshots are transmitted over a network (such as the well-known Internet) to the remote destination storage system. By "active file system" it is meant the file system to which current input/output operations are being directed.

Note that the term "snapshot" is a trademark of Network Appliance, Inc. It is used for purposes of this patent to designate a persistent consistency point image (PCPI). A persistent consistency point image is a point in time representation of the storage system, and more particularly, of the active file system, stored on a storage device or in other persistent memory and having a name or other unique identifier that distinguishes it from other PCPIs taken at other points in time. A PCPI can also include other information (metadata) about the active file system at the particular point in time for which the image is taken. The terms PCPI and snapshot may be used interchangeably through out this patent without derogation of Network Appliance's trademark rights. The PCPI process is described in further detail in U.S. patent application Ser. No. 09/932,578, entitled INSTANT SNAPSHOT by Blake Lewis et al., TR3002 *File System Design for an NFS File Server Appliance* by David Hitz et al., published by Network Appliance, Inc., and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., which are hereby incorporated by reference.

An exemplary PCPI-based mirroring technique typically provides remote asynchronous replication or mirroring of changes made to a source file system in a destination replica file system. Broadly stated, the mirroring technique typically scans (via a scanner) the blocks that make up two versions of a PCPI of the source file system to identify latent divergence, i.e., changed blocks, in the respective PCPI files, based upon differences in vbns further identified in a scan of a logical file block index of each PCPI. Trees (e.g., buffer trees) of blocks associated with the files are traversed, bypassing unchanged pointers between versions, to identify the changes in the hierarchy of the trees. These changes are transmitted to the destination replica. This technique allows regular files, directories, inodes and any other hierarchical structure of trees to be efficiently scanned to determine differences (latent divergence) between versions thereof. A set number of PCPIs may be retained both on the source and destination file systems depending upon various time-based and other criteria.

Conventional mirroring and archival backup systems typically include processes to ensure that the data set is correctly mirrored, to thereby reduce the divergence of the replica (i.e. mirror) from the original source file system. However, errors may occur in the mirror due to, e.g., network, software and/or physical media malfunctions of the storage devices. As a result of such errors, the mirror is not identical to the source file system, which may cause data loss should an error condition occur on the source storage system. Additionally, the file systems on either the source or destination storage systems may experience an error condition. The file system error may be corrected by conventional file system error correction techniques; however, such correction may exacerbate mirror divergence. Additionally, as the destination is typically a read-only volume, to correct the destination requires that the mirroring relationship be broken and the destination volume converted to a read/write volume. To ensure that a correct mirror is on the destination storage system, a new mirroring relationship may need to be established that includes an initial baseline backup operation performed on the data set. Establishment of the mirroring relationship is computationally, I/O resource and network intensive, and does not guarantee that the administrator has retained one or more point in time mirrors of file system images previous to the establishment of the new mirroring relationship. That is, although the new mirror may be up to date, it does not reflect the contents of the mirrored source storage system at a previous point in time, thereby reducing the effectiveness of the mirror.

SUMMARY OF THE INVENTION

The disadvantages of the prior art are overcome by providing a system and method for verifying and correcting consistency of mirrored data sets between source and destination storage systems. The present invention is illustratively implemented as a "destination" verification module of a storage operating system executing on the destination storage system that cooperates with a "source" verification module executing on the source storage system.

The source verification module cooperates with the destination verification module to determine the most recent PCPI that is common between the source and destination storage systems. This most recent PCPI is then utilized in performing the verification/correction. Illustratively, the verification modules may perform a verification using a plurality of difference modes. In a first mode, a combined verification and repair procedure is executed. In a second mode, only a verification procedure is executed resulting in the need to execute a separate repair procedure should any data mismatches (inconsistencies) be identified. Furthermore, in an alternate embodiment, either the combined or separate verification/repair techniques may be utilized wherein only checksum information is forwarded over the network, in place of complete data blocks, thereby reducing network bandwidth consumption.

Once the most recent PCPI has been identified, the source verification module generates a data stream of either checksum information and/or the data blocks associated with that PCPI and all older PCPIs located on the source storage system and sends the data stream to the destination storage system. Upon recovering the data stream, the destination verification module compares the received blocks of data and/or checksums with the data associated with the PCPIs stored on the destination storage system. If the combined verify/repair procedure is performed and one or more data mismatches between the source and destination PCPIs are identified, the destination verification module corrects the destination PCPIs so that they are consistent with the source PCPIs.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network and Storage System Environment

Figure 1:
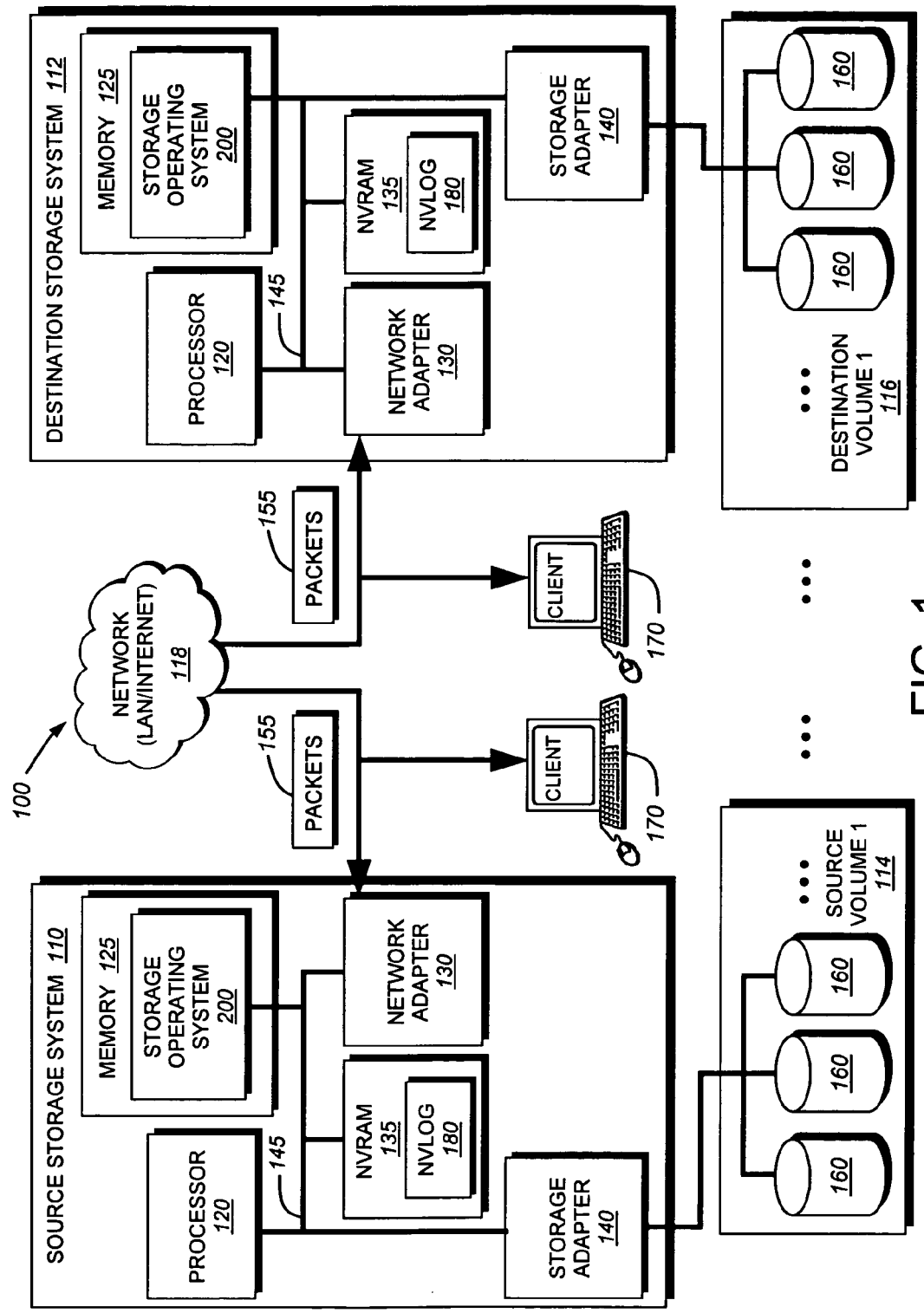
FIG. 1 is a schematic block diagram of an exemplary mirrored storage system environment in accordance with an embodiment of the present invention.

FIG. 1 is a schematic block diagram of a storage system environment 100 that includes a pair of interconnected storage systems including a source storage system 110 and a destination storage system 112 that may be advantageously used with the present invention. For the purposes of this description, the source storage system is a networked computer that manages storage on one or more source volumes 114, each comprising an array of storage disks 160 (described further below). Likewise, the destination storage system 112 manages the storage on one or more destination volumes 116 comprising arrays of disks 160. The source and destination storage systems are linked via a network 118 that can comprise a local or wide area network, such as the well-known Internet. An appropriate network adapter 130 residing in each storage system 110, 112 facilitates communication over the network 118. Also for the purposes of this description, like components in each of the source and destination storage system 110 and 112 respectively, are described with like reference numerals. As used herein, the term "source" can be broadly defined as a location from which the subject data travels during a mirroring operation and the term "destination" can be defined as the location to which the data travels. While a source storage system and a destination storage system, connected by a network, is a particular example of a source and destination used herein, a source and destination could be computers/storage systems linked via a direct link, or via loopback (a "networking" arrangement internal to a single computer for transmitting a data stream between local source and local destination), in which case the source and the destination are the same storage system.

In the particular example of a pair of networked source and destination storage systems, each storage system 110 and 112 can be any type of special-purpose computer (e.g., server) or general-purpose computer, including a standalone computer. Each storage system 110, 112 comprises a processor 120, a memory 125, a network adapter 130 and a storage adapter 140 interconnected by a system bus 145. Each storage system 110, 112 also includes a storage operating system 200 that manages data and may implement a file system to logically organize the information as a hierarchical structure of directories and files on the disks.

It will be understood to those skilled in the art that the inventive technique described herein may apply to any type of special-purpose computer (e.g., file serving appliance) or general-purpose computer, including a standalone computer, embodied as a storage system. An example of a storage system that may be advantageously used with the present invention is described in U.S. patent application Ser. No. 10/215,917 titled, MULTI-PROTOCOL STORAGE APPLIANCE THAT PROVIDES INTEGRATED SUPPORT FOR FILE AND BLOCK ACCESS PROTOCOLS, filed on Aug. 8, 2002. Moreover, the teachings of this invention can be adapted to a variety of storage system architectures including, but not limited to, a network-attached storage (NAS) environment, a storage area network (SAN) and disk assembly directly-attached to a client or host computer. The term "storage system" should therefore be taken broadly to include such arrangements in addition to any subsystems configured to perform a storage function and associated with other equipment or systems.

In the illustrative embodiment, the memory 125 comprises storage locations that are addressable by the processor and adapters for storing software program code and data structures. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The operating system 200, portions of which are typically resident in memory and executed by the processing elements, functionally organizes the storage system by, inter alia, invoking storage operations in support of a file service implemented by the storage system. It will be apparent to those skilled in the art that other processing and memory means, including various computer readable media, may be used for storing and executing program instructions pertaining to the inventive technique described herein.

The network adapter 130 comprises the mechanical, electrical and signaling circuitry needed to connect each storage system 110, 112 to the network 118, which may comprise a point-to-point connection or a shared medium, such as a local area network. Each storage system may also be interconnected with one or more clients 170 via the network adapter 130. The clients transmit requests for file service to the source and destination storage systems 110, 112, respectively, and receive responses to the requests over a LAN or other network (118). The client 170 may communicate with the storage system over network 118 by exchanging discrete frames or packets of data according to predefined protocols, such as the Transmission Control Protocol/Internet Protocol (TCP/IP). Moreover, the client may interact with the storage system 110, 112 in accordance with a client/server model of information delivery. That is, the client may request the services of the storage system, and the system may return the results of the services requested by the client, by exchanging packets 155 over the network 118. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 140 cooperates with the storage operating system 200 executing on the storage system to access information requested by the client. The information may be stored on the disks 160 that are attached, via the storage adapter 140 to each storage system 110, 112 or other node of a storage system as defined herein. The storage adapter 140 includes input/output (I/O) interface circuitry that couples to the disks over an I/O interconnect arrangement, such as a conventional high-performance, Fibre Channel serial link topology. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 160, such as hard disk drivers (HDD) and/or direct attached storage devices (DASD).

Storage of information on disks 160 is preferably implemented as one or more storage "volumes" that comprise a collection of physical storage disks 160 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

B. Storage Operating System

To facilitate access to the disks 160, the storage operating system 200 illustratively implements a write-anywhere file system that cooperates with virtualization modules to "virtualize" the storage space provided by disks 160. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is illustratively the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

Figure 2:
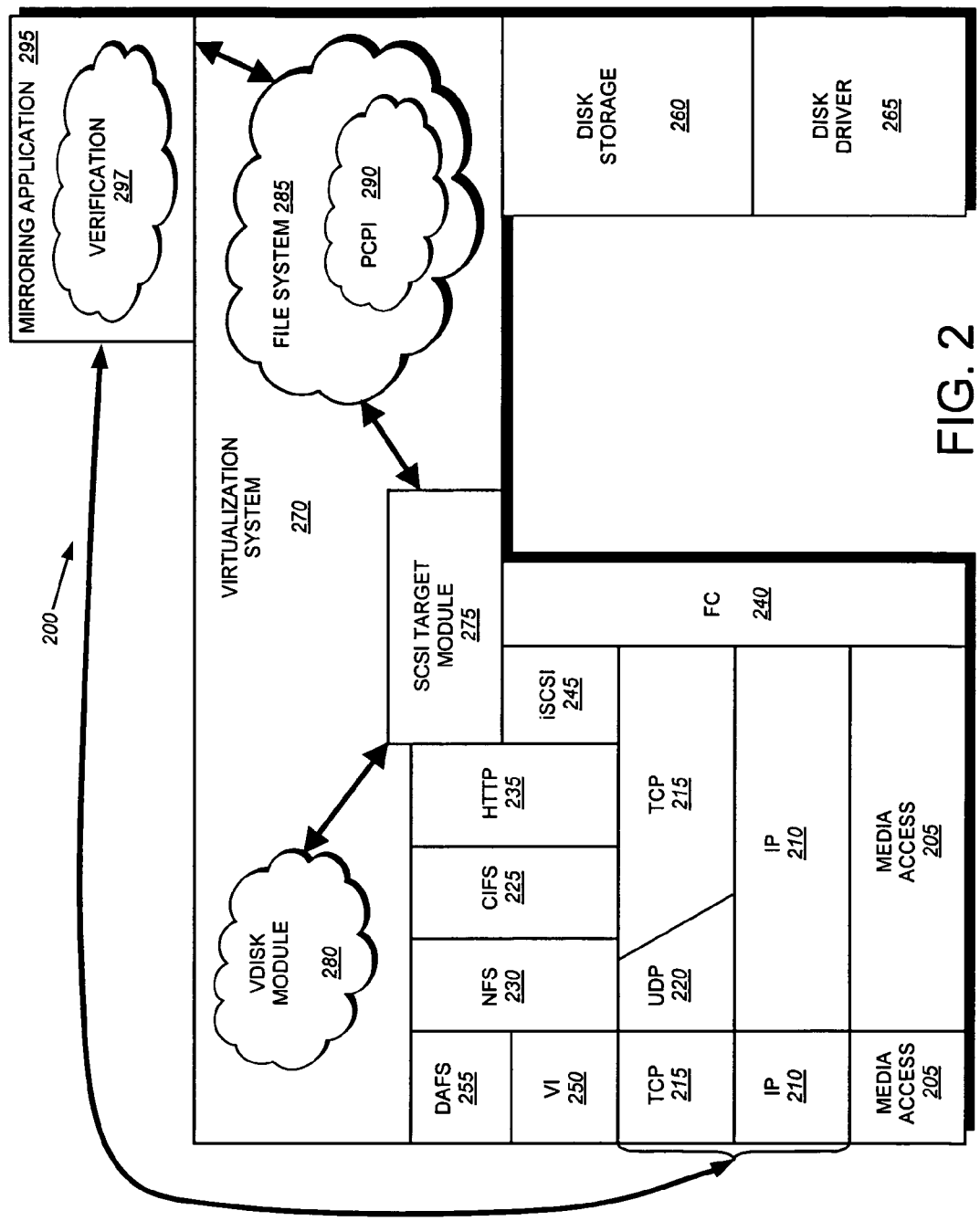
FIG. 2 is a schematic block diagram of an exemplary storage operating system in accordance with an embodiment of the present invention.

FIG. 2 is a schematic block diagram of an exemplary storage operating system 200 that may be advantageously used with the present invention. The storage operating system comprises a series of software modules organized to form an integrated network protocol stack or, more generally, a multi-protocol engine that provides data paths for clients to access information stored on the storage system using block and file access protocols. The protocol stack includes a media access layer 205 of network drivers (e.g., gigabit Ethernet drivers) that interfaces to network protocol layers, such as the IP layer 210 and its supporting transport mechanisms, the TCP layer 215 and the User Datagram Protocol (UDP) layer 220. A file system protocol layer provides multi-protocol file access and, to that end, includes support for the Direct Access File System (DAFS) protocol 255, the NFS protocol 230, the CIFS protocol 225 and the Hypertext Transfer Protocol (HTTP) protocol 235. A VI layer 250 implements the VI architecture to provide direct access transport (DAT) capabilities, such as RDMA, as required by the DAFS protocol.

An iSCSI driver layer 245 provides block protocol access over the TCP/IP network protocol layers, while a FC driver layer 240 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a disk storage module 260 embodied as a RAID system that manages the storage and retrieval of information to and from the volumes/disks in accordance with I/O operations, and a disk driver system 265 that implements a disk access protocol such as, e.g., the SCSI protocol.

Bridging the disk software layers with the integrated network protocol stack layers is a virtualization system 270 that is implemented by a file system interacting with virtualization modules illustratively embodied as, e.g., vdisk module 280 and SCSI target module 275. The vdisk module 280 is layered on the file system to enable access by administrative interfaces, such as a user interface (UI), in response to a user (system administrator) issuing commands to the storage system. The SCSI target is disposed between the FC and iSCSI drivers and the file system to provide a translation layer of the virtualization system between the block (lun) space and the file system space, where luns are represented as blocks.

The file system is illustratively a message-based system that provides logical volume management capabilities for use in access to the information stored on the storage devices, such as disks. That is, in addition to providing file system semantics, the file system provides functions normally associated with a volume manager. These functions include (i) aggregation of the disks, (ii) aggregation of storage bandwidth of the disks, and (iii) reliability guarantees, such as mirroring and/or parity (RAID). The file system illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an FS info block that is preferably stored at a fixed location within, e.g., a RAID group. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client is forwarded as a packet 155 over the computer network 118 and onto the storage system where it is received at the network adapter. A network driver (of layer 205 or layer 240) processes the packet and, if appropriate, passes it on to a network protocol and file access layer for additional processing prior to forwarding to the write-anywhere file system 285. Here, the file system generates operations to load (retrieve) the requested data from disk if it is not resident "in core," i.e., in memory 125. If the information is not in the memory, the file system indexes into the inode file using the inode number to access an appropriate entry and retrieve a logical vbn. The file system then passes a message structure including the logical vbn to the RAID system 260; the logical vbn is mapped to a disk identifier and disk block number (disk,dbn) and sent to an appropriate driver (e.g., SCSI) of the disk driver system 265. The disk driver accesses the dbn from the specified disk and loads the requested data block(s) in memory 125 for processing by the storage system. Upon completion of the request, the storage system (and operating system) returns a reply to the client over the network 118.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system in response to a request issued by client 170. Moreover, in another alternate embodiment of the invention, the processing elements of adapters 130, 140 may be configured to offload some or all of the packet processing and storage access operations, respectively, from processor 120, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the Data ONTAP software is an example of such a storage operating system implemented as a microkernel and including a file system 285 to implement the WAFL file system semantics and manage data access. The storage operating system can also be implemented as an application program operating over a general-purpose operating system, such as UNIX® or Windows XP®, or as a general-purpose operating system with configurable functionality, which is configured for storage applications as described herein.

The file system 285 also includes a set of PCPI processes 290 that enable the file system to generate PCPIs of the active file system, as described further below. Also included within the storage operating system 200 is a mirroring application module 295. The mirroring application module 295 illustratively generates appropriate mirrors of data sets and manages data backups in accordance with an embodiment of the present invention. In accordance with an illustrative embodiment of the present invention, a verification module 297 is associated with the mirroring application module 295. The verification module 297 illustratively performs verification and/or correction of errors in accordance with the teachings of the present invention, as described further below.

C. Persistent Consistency Point Images

As noted above, in certain mirroring architectures, storage systems utilize PCPIs. For example, source storage system 110 ("source") may generate a baseline PCPI that is transferred to destination storage system 112 ("destination"). At a later point in time, the source storage system may generate a second PCPI. The mirroring application module 295 determines the changes between the baseline and the second PCPIs, with only those changes being transmitted to the destination, which may then update its file system and generate a second PCPI so that the baseline and second PCPIs are identical on both the source and destination.

PCPIs are generally created on some regular schedule that may be subject to great variation. In addition, the number of PCPIs retained by the storage system is highly variable. Under one storage scheme, a number of recent PCPIs is stored in succession (for example, a few days worth of PCPIs each taken at four-hour intervals), and a number of older PCPIs is retained at increasing time spacings (for example, a number of daily PCPIs for the previous week(s) and weekly PCPI for the previous few months). Each PCPI is stored on-disk along with the active file system, and is called into the memory 125 of the storage system as requested by the storage operating system 200 or mirroring application 295. However, it is contemplated that a variety of PCPI creation techniques and timing schemes can be implemented within the teachings of this invention.

Figure 3:
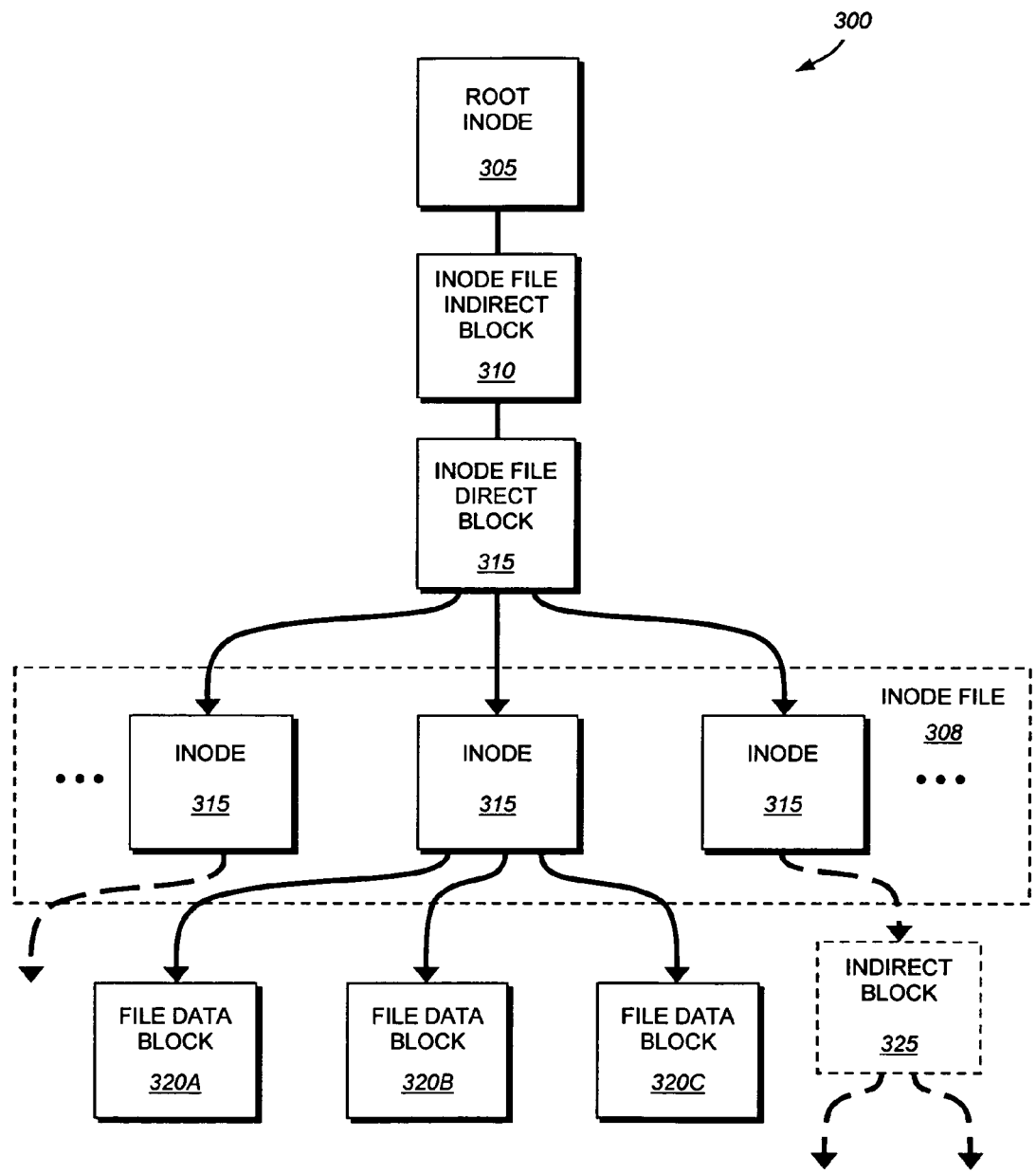
FIG. 3 is a schematic block diagram of an exemplary inode buffer tree in accordance with an embodiment of the present invention.

An exemplary file system inode structure 300 according to an illustrative embodiment is shown in FIG. 3. The inode for the inode file or more generally, the "root" inode 305 contains information describing inode file 308 associated with a given file system. In this exemplary file system inode structure root inode 305 contains a pointer to the inode file indirect block 310. The inode file indirect block 310 points to one or more inode file direct blocks 312, each containing a set of pointers to inodes 315 that make up the inode file 308. The depicted subject inode file 308 is organized into volume blocks (not separately shown) made up of inodes 315 which, in turn, contain pointers to file data (or "disk") blocks 320A, 320B and 320C. In the diagram, this is simplified to show just the inode itself containing pointers to the file data blocks. Each of the file data blocks 320(A-C) is adapted to store, in the illustrative embodiment, 4 kilobytes (KB) of data. Note, however, where more than a predetermined number of file data blocks are referenced by an inode (315), one or more indirect blocks 325 (shown in phantom) are used. These indirect blocks point to associated file data blocks (not shown).

Figure 4:
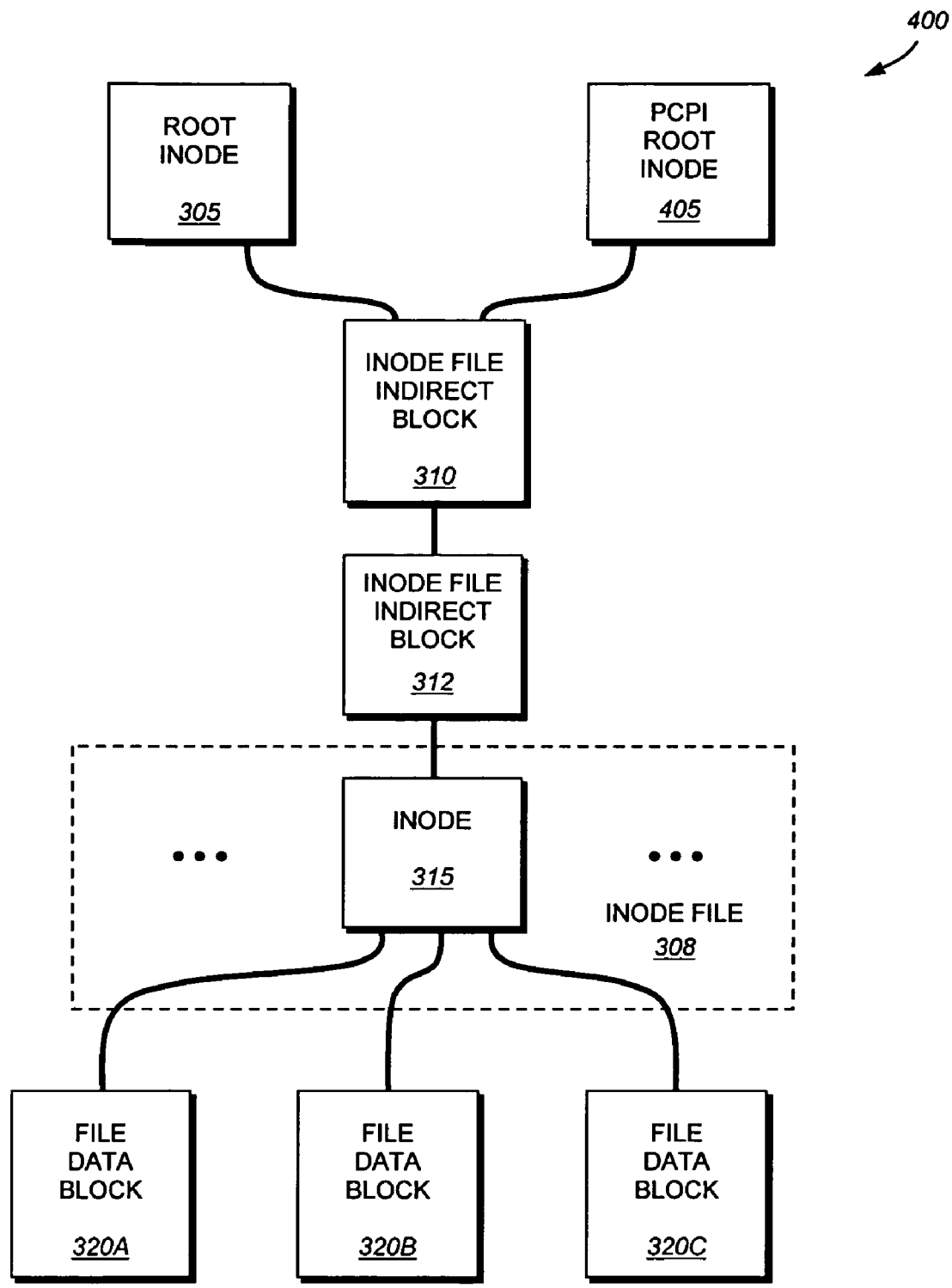
FIG. 4 is a schematic block diagram of an exemplary inode buffer tree showing a persistent consistency point image inode.

When the file system generates a PCPI of a given file system, a PCPI root inode is generated as shown in FIG. 4. The PCPI root inode 405 is, in essence, a duplicate copy of the root inode 305 of the file system 300. Thus, the exemplary file system structure 400 includes the same inode file indirect block 310, inode file direct block 312, inodes 315 and file data blocks 320(A-C) as depicted in FIG. 3. When a user modifies a file data block, the file system writes the new data block to disk and changes the active file system to point to the newly created block.

Figure 5:
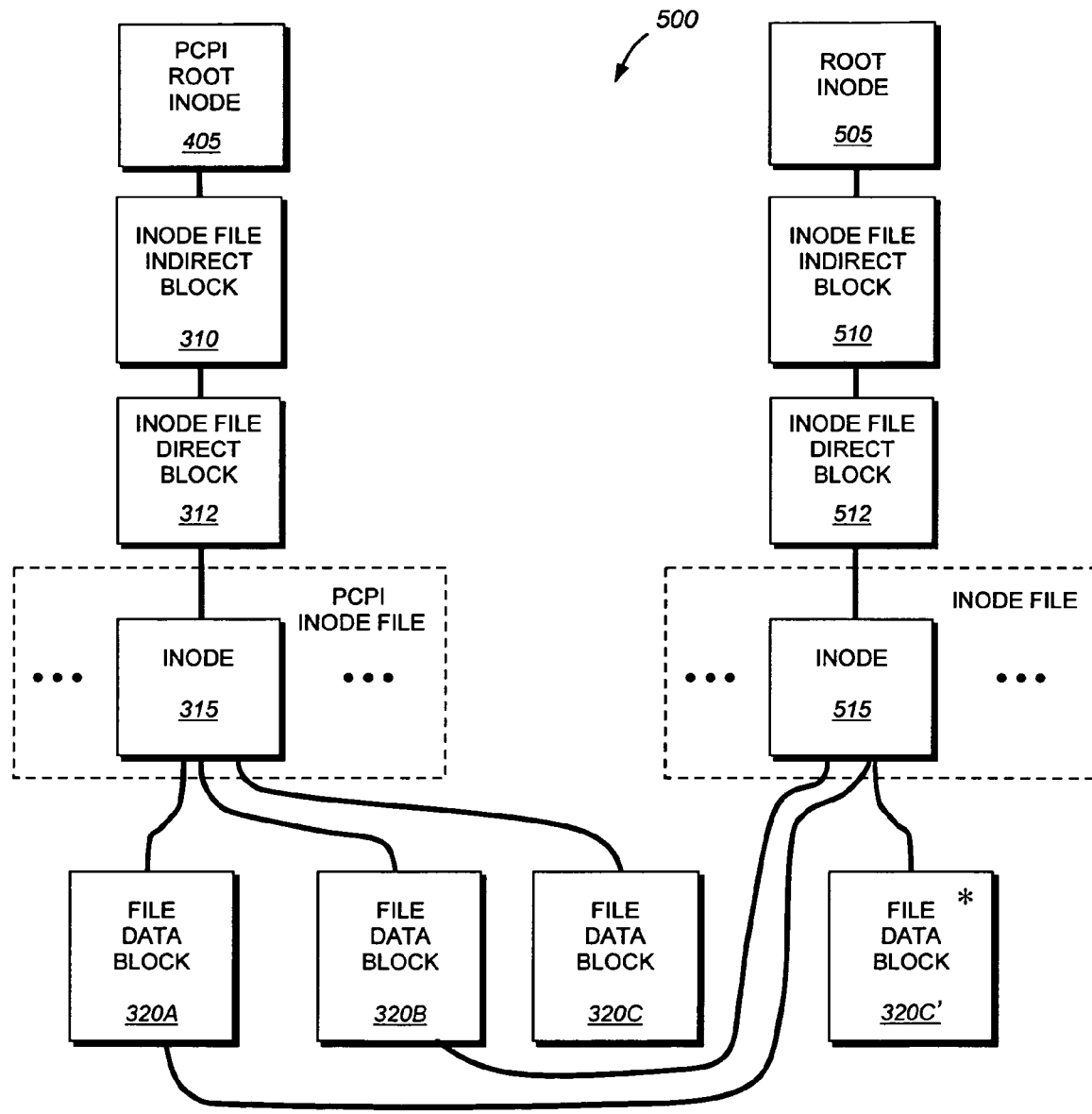
FIG. 5 is a schematic block diagram of an exemplary inode buffer tree showing the copy on write nature of a file system in accordance with an embodiment of the present invention.

FIG. 5 shows an exemplary inode file system structure 500 after a file data block has been modified. In this illustrative example, file data which is stored at disk block 320C is modified. The file system writes the modified contents to disk block 320C', which is a new location on disk. Because of this new location, the inode file data which is stored at disk block 315 is rewritten so that it points to block 320C'. This modification causes the file system to allocate a new disk block 515 for the updated version of the data at 315. Similarly, the inode file indirect block 310 is rewritten to block 510 and direct block 312 is rewritten to block 512, to point to the newly revised inode 515. Thus, after a file data block has been modified the PCPI root inode 405 contains a pointer to the original inode file system indirect block 310 which, in turn, contains a link to the inode 315. This inode 315 contains pointers to the original file data blocks 320A, 320B and 320C. However, the newly written inode 515 includes pointers to unmodified file data blocks 320A and 320B. The inode 515 also contains a pointer to the modified file data block 320C' representing the new arrangement of the active file system. A new file system root inode 505 is established representing the new structure 500. Note that metadata in any PCPI blocks (e.g. blocks 310, 315 and 320C) protects these blocks from being recycled or overwritten until they are released from all PCPIs. Thus, while the active file system root inode 505 points to new blocks 510, 512, 515 and 320C', the old blocks 310, 315 and 320C are retained until the PCPI is fully released.

In accordance with an illustrative embodiment of the present invention, the mirroring application module 295 may permit the mirroring of various PCPIs between the source and destination. This may be due to, for example, incremental changes that are sent at various points in time, which are represented within the file systems as persistent consistency point images (PCPIs). Typically, a first PCPI is utilized to perform a baseline backup to the destination. At some later point in time a second PCPI is generated, which is compared with the first PCPI to generate a set of changes that is transferred to the destination.

D. Verification and Repair of Mirrors

The present invention provides a system and method for verifying and correcting consistency of mirrored data sets between source and destination storage systems. The present invention is illustratively implemented as a first verification module of a storage operating system executing on the destination storage system (the "destination verification module") that cooperates with a second verification module executing on the source storage system (the "source verification module").

The source verification module cooperates with the destination verification module by, e.g., exchanging messages, to determine the most recent PCPI that is common between the source and destination. This most recent PCPI is then utilized in performing the verification/correction. Illustratively, the verification modules may perform a verification using a plurality of difference modes. In a first mode, a combined verification and repair procedure is executed. In a second mode, only a verification procedure is executed resulting in the need to execute a separate repair procedure should any data mismatches (inconsistencies) be identified. Furthermore, in an alternate embodiment, either the combined or separate verification/repair techniques may be utilized wherein only checksum information is forwarded over the network, in place of complete data blocks, thereby reducing network bandwidth consumption.

Once the most recent PCPI has been identified, the source verification module generates a data stream of either checksum information and/or the data blocks associated with that PCPI or any older PCPIs located on the source and sends the data stream to the destination. Upon recovering the data stream, the destination verification module compares the received blocks of data and/or checksums with the data associated with the PCPIs stored on the destination. If the combined verify/repair procedure is performed and one or more data mismatches between the source and destination PCPIs are identified, the destination verification module corrects, by, e.g., overwriting the corrupted data with the correct data, the destination PCPIs so that it is consistent with the source PCPIs.

Figure 6:
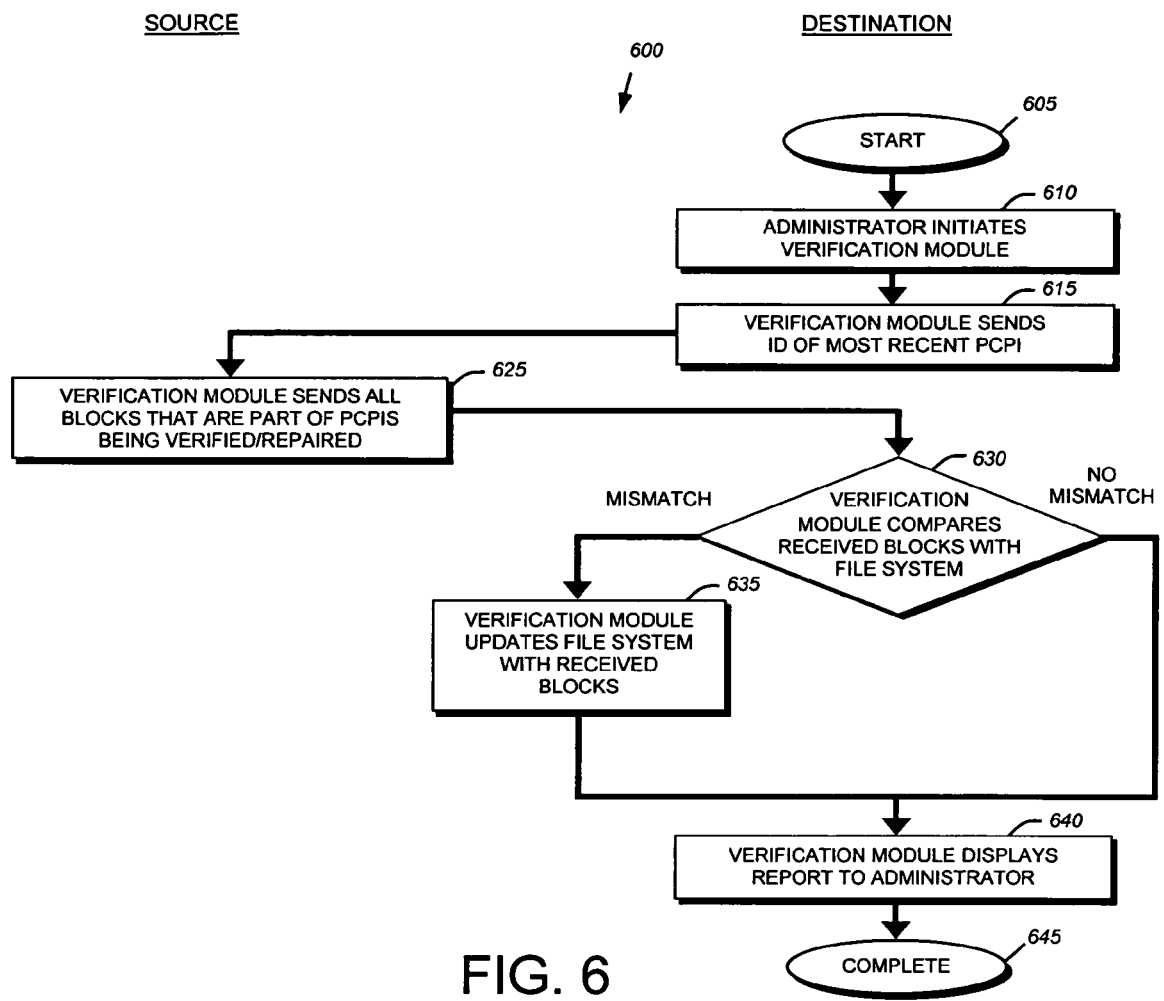
FIG. 6 is a flowchart detailing the steps of a procedure for verifying and repairing mirrored data set in accordance with an embodiment of the present invention.

FIG. 6 is a flowchart detailing the steps of a procedure 600 for verifying the consistency of a mirror (or other archival data backup) in accordance with an illustrative embodiment of the present invention. The procedure 600 begins in step 605 and continues to step 610 where an administrator invokes (initiates) the novel verification module 297 of the present invention. The verification module may be initiated via a command line interface (CLI) command or a graphical user interface (GUI). In alternate embodiments, the verification module may be automatically invoked. For example, the system administrator may configure the storage system so that the verification module executes on a daily basis or may, e.g., at the conclusion of any mirroring activity. In an illustrative embodiment, when invoking the verification module, the administrator identifies a list of PCPIs to be verified.

An exemplary CLI command to invoke the verification module is:
mirror check start [-F] [-L {data|checksum}] [-d<PCPI name>] [-S<source>]<destination>
where mirror check start specifies that the checking functionality of the mirroring application should be initiated. The -F option starts a correction repair process (fixer). If the -F option is not selected, a verification (or checking) process is initiated instead, as described further below. The -L option permits the administrator to select a data comparison level, namely either data or checksum. The data level causes all data blocks to be compared on a byte-by-byte basis. The checksum level utilizes RAID checksums to compare data blocks, which expedites the verification procedure, but may be less accurate. The -d option enables the administrator to identify a specific PCPI by name that is to be used on the destination. The -S option permits an administrator to identify a source storage system and volume. It should be noted that the CLI command verifies that the identified source is in a mirror relationship before executing. Thus, should an administrator identify a source that is not in a mirroring relationship, the command fails. The destination field identifies the destination volume that is to be verified.

In response, the destination verification module, in step 615, sends an identifier of the most recent PCPI on the destination to the source. Illustratively, if the destination's most recent PCPI is not available on the source due to, e.g., deletion, then the source and destination verification modules perform a negotiation routine to identify the most recent common PCPI between the source and destination. Once the most recent common PCPI has been identified, the source verification module, in step 625, generates and transmits a data stream of data blocks that comprise the most recent common PCPI and all data blocks that are part of any older PCPI on the source to the destination. The destination verification module receives the blocks and, in step 630, compares the received blocks with the PCPIs stored on the destination file system. If there are no mismatches, i.e., the received data blocks match the data stored within the destination file system, the procedure continues to step 640 where the destination verification module displays a report to the administrator showing that there were no mismatches. The procedure 600 then completes in step 645.

However, if in step 630, one or more mismatches occur, i.e., the received data blocks do not match the data stored on the destination file system, then the destination verification module updates the destination file system using the data from the received blocks in step 635 so that the destination file system is consistent with the source file system. The destination verification module then displays a report to the administrator in step 640 before the procedure 600 completes in step 640.

Figure 7:
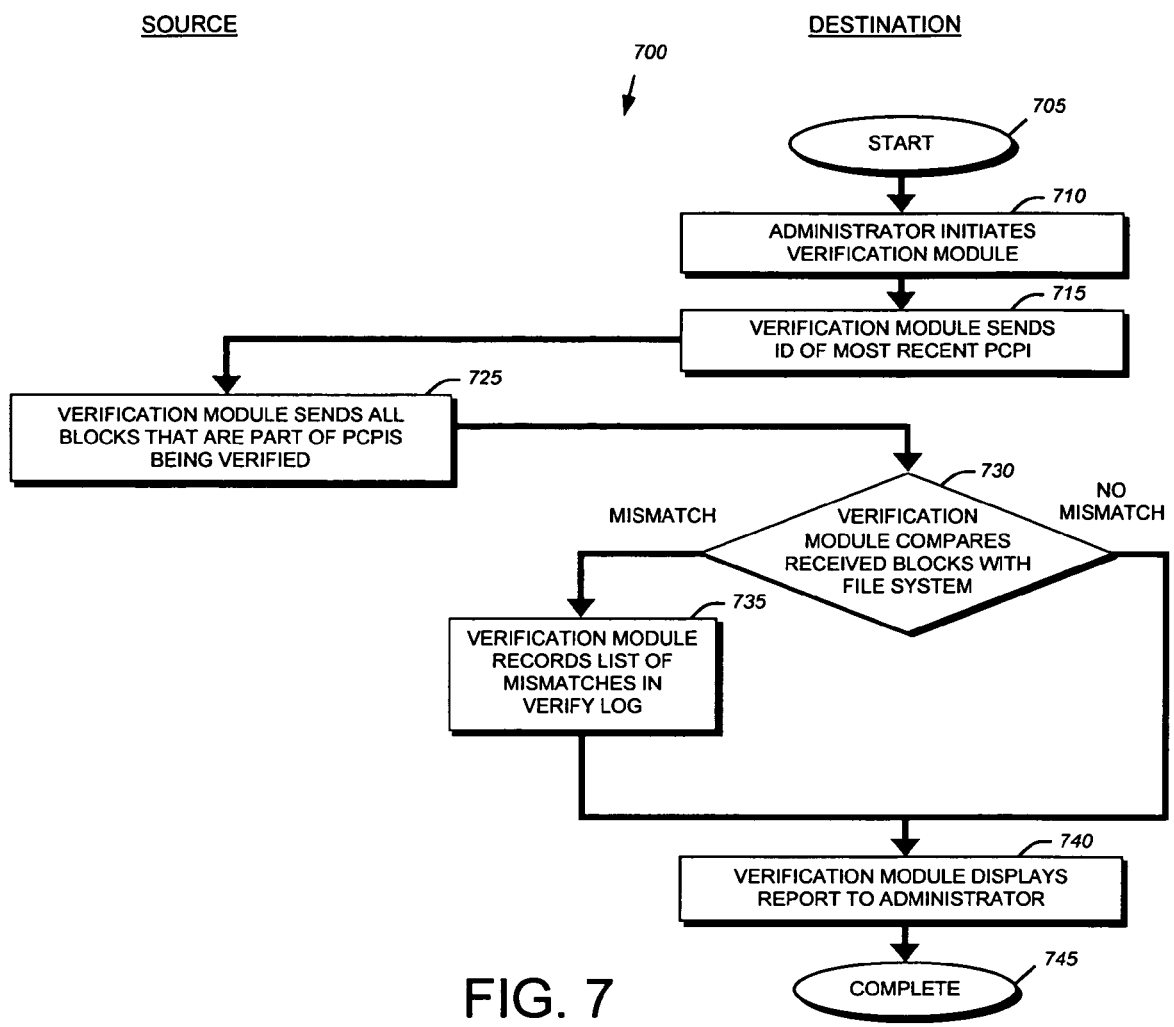
FIG. 7 is a flowchart detailing the steps of a procedure for verifying a mirrored data set in accordance with an embodiment of the present invention.

FIG. 7 is a flowchart detailing the steps of a procedure 700 for verifying a mirrored data set in accordance with an embodiment of the present invention. The procedure 700 begins in step 705 and continue step 710 where an administrator initiates the verification module signifying that only a verification (and not a repair) operation should occur. In response, the destination verification module sends an identifier of the most recent PCPI to the source in step 715. In response, the source verification module generates and transmits a data stream comprising all blocks of the identified PCPI and any older PCPIs on the source in step 725. Furthermore, the source verification module sends a list of the PCPIs with which the blocks are associated. The destination verification module records this list in a verify log, which is utilized to later identify the blocks to be corrected (see FIG. 8). The destination verification module compares the received blocks from the source with the destination file system in step 730. Should there be any mismatches, the destination verification module records the list of mismatches in a verify log in step 735. Illustratively, the verify log is stored within a hidden metadata directory of the destination file system. However, it should be noted that the verify log may be stored in any form of persistent storage. Illustratively, the verify log comprises a list of block numbers in which mismatches occurred. After recording the list of mismatches, the destination verification module displays a report to the administrator in step 740 before the procedure completes in step 745. However, if in step 730 no mismatches are detected, then the procedure branches from step 730 to step 740 where the destination verification module displays a report to the administrator before the procedure completes in step 745.

Figure 8:
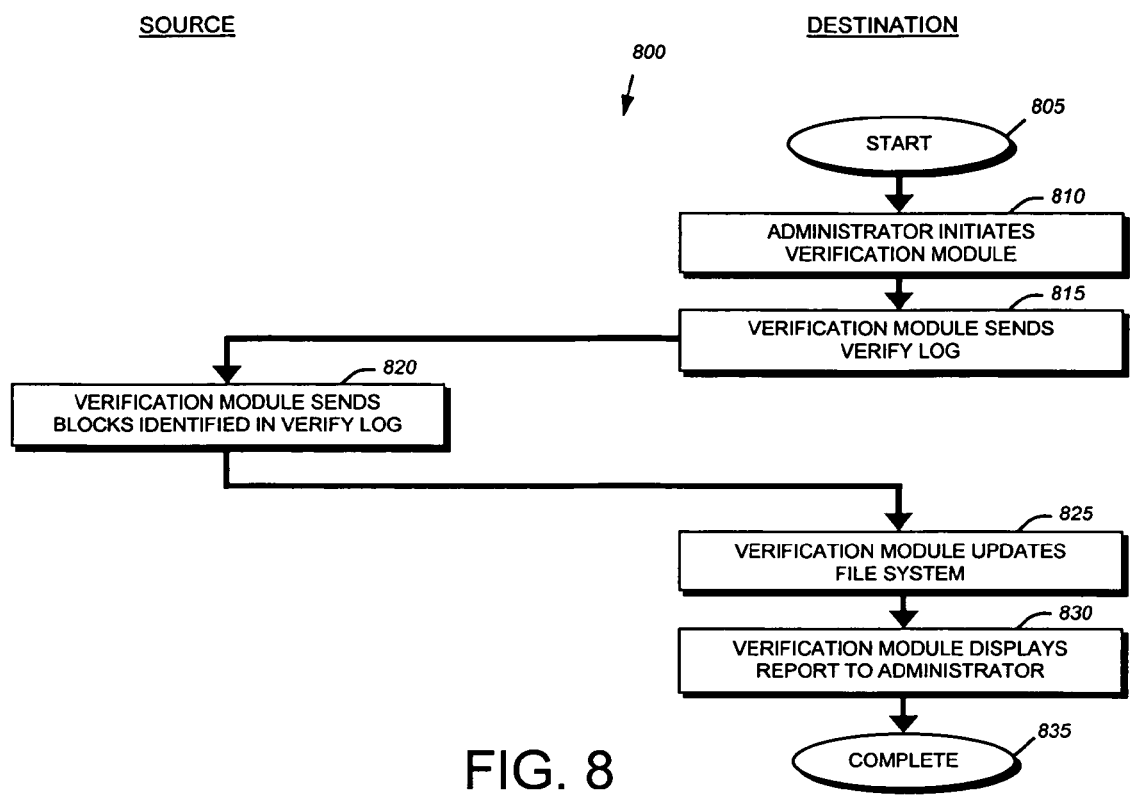
FIG. 8 is a flowchart detailing the steps of a procedure for repairing a mirrored data set in accordance with an embodiment of the present invention.

FIG. 8 is a flowchart detailing the steps of a procedure 800 for repairing a mirrored data set using a verify log in accordance with an embodiment of the present invention. The procedure 800 begins in step 805 and continues to step 810 where the administrator initiates the verification module and signifies that a repair operation should occur. In response, the destination verification module transmits the contents of the verify log to the source verification module (step 815), which identifies the blocks and PCPIs containing mismatched data. Once the blocks that do not match have been identified from the verify log, the source verification module sends the identified blocks to the destination in step 820. The destination verification module receives the identified data blocks and, in step 825, updates the destination file system to render it consistent with the source file system. Once the destination file system update has been completed, the destination verification module displays a report to the administrator in step 830 before the procedure completes in step 835. Furthermore, once the destination file system has been updated, the verify log may be deleted.

Figure 9:
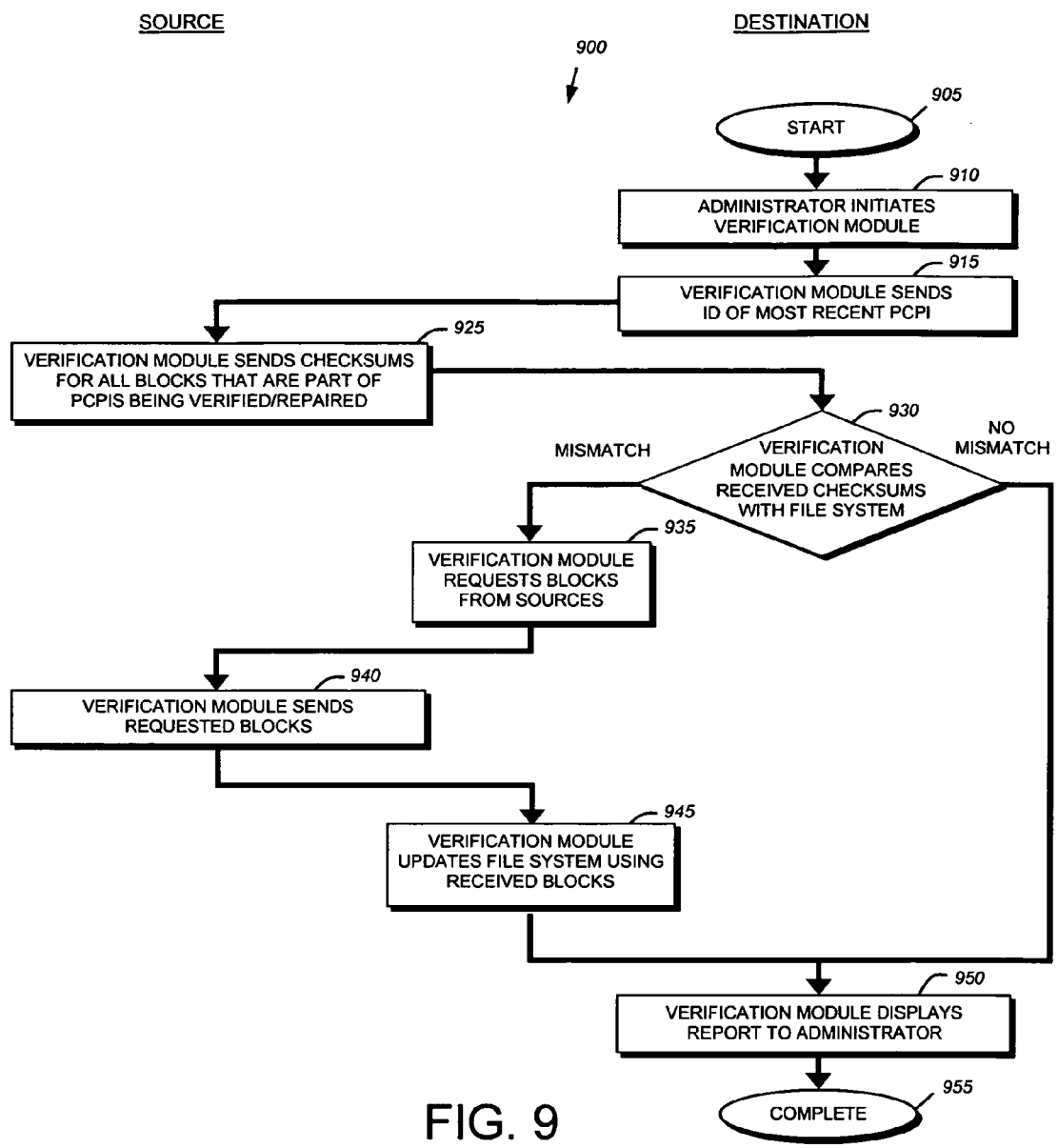
FIG. 9 is a flowchart detailing the steps of a procedure for verifying and repairing a mirrored data set utilizing checksums in accordance with an embodiment of the present invention.

FIG. 9 is a flowchart detailing the steps of a procedure for verifying and repairing a mirrored data set using checksums in accordance with an embodiment of the present invention. The procedure 900 begins in step 905 and continues to step 910 where the administrator initiates the verification module and selects the checksum only mode. In step 915, the destination verification module sends an identifier of the most recent PCPI to the source. In response, the source verification module, in step 925, generates and transmits a data stream comprising the checksums of all blocks that comprise the identified most recent common PCPI and all older PCPIs on the source. As noted above, typically each block of data stored on disk is also stored with a set of RAID checksums. In this illustrative embodiment, the RAID checksums for the blocks of data (and not the data itself) are transmitted, thereby achieving a several order of magnitude of the amount of data being transmitted. For example, typically the RAID checksums for a 4 KB block of data comprise four bytes of checksum information. In step 930, the destination verification module compares the received checksums with the checksums stored within the destination file system. If there are no mismatches, i.e., the received checksums match the checksums stored in the destination file system, then there is a substantially high probability that the mirrored data is consistent between the source and destination. If there are no mismatches, the procedure 900 continues to step 950 where the destination verification module displays a report to the administrator before the procedure completes in step 955.

However, if in step 930, the destination verification module detects one or more mismatches between the received checksums and the checksums stored within the destination file system, then the procedure branches to step 935 where the destination verification module requests the blocks associated with the mismatched RAID checksums from the source. The source verification module sends the requested blocks, in step 940, to the destination verification module, which utilizes the received blocks to update the destination file system in step 945 so that it is consistent with the source file system. The destination verification module then displays a report to the administrator in step 950 before the procedure completes in step 955.

Figure 10:
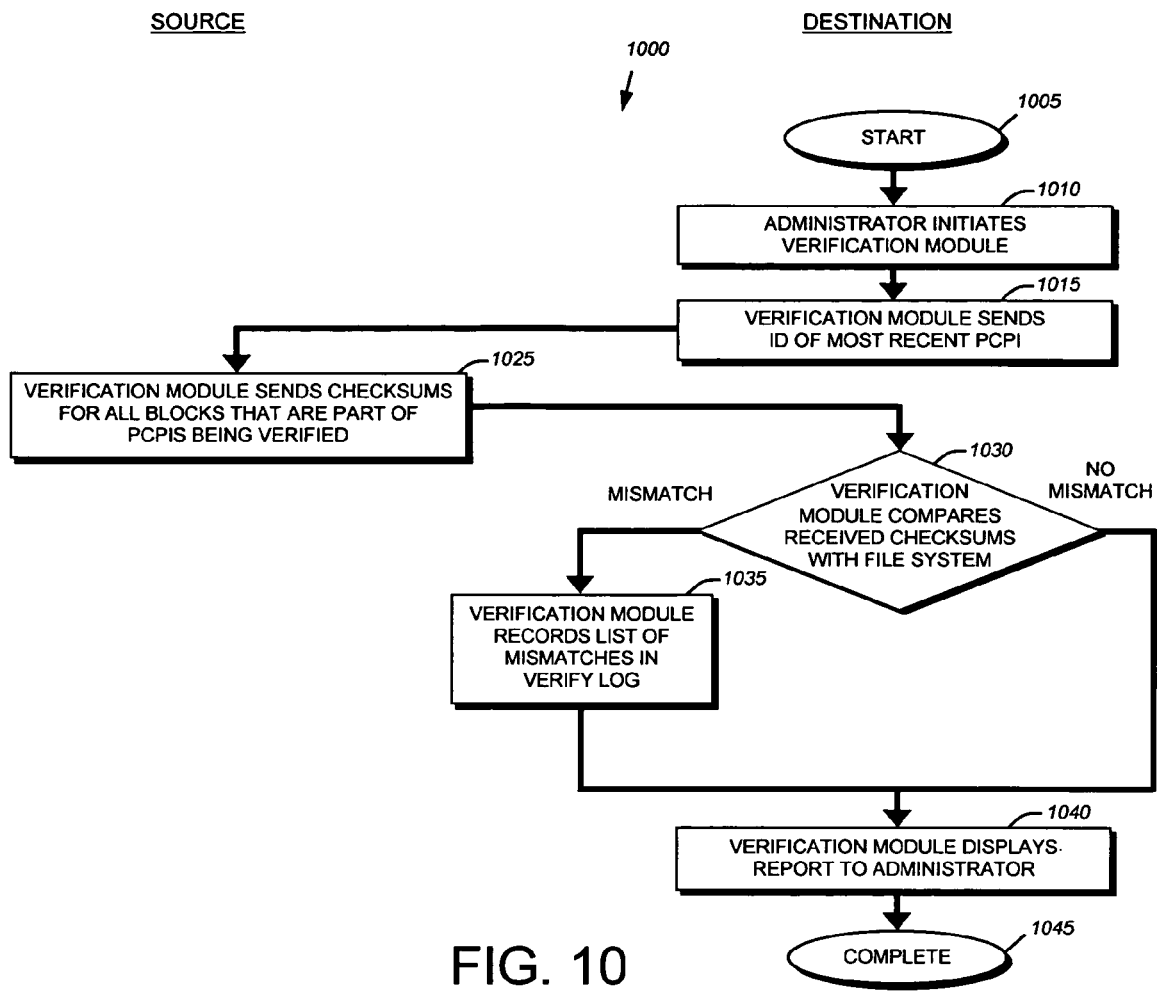
FIG. 10 is a flowchart detailing the steps of a procedure for verifying a mirrored data set using checksums in accordance with an embodiment of the present invention.

FIG. 10 is a flowchart detailing the steps of a procedure 1000 for performing a verification procedure utilizing checksums in accordance with an embodiment of the present invention. The procedure 1000 begins in step 1005 and continues to step 1010 where an administrator initiates the destination verification module and signifies a verify only mode using checksums. As noted above, this initiation may be caused by software. As such, the description of an administrator initiating the destination verification module should be taken as exemplary only. In step 1015, the destination verification module sends an identifier of the most recent common PCPI to the source. The source verification module begins sending the checksums for all blocks of the most recent common PCPI and all older PCPIs on the source in step 1025. Additionally, the source verification module sends a list of the PCPIs with which the checksums are associated. The list of PCPIs is recorded in the verify log by the destination verification module. The destination verification module compares the received checksums with the destination file system in step 1030. Should there be no mismatches, the procedure then continues to step 1040 where the destination verification module displays a report to the administrator before the procedure completes in step 1045. However, if in step 1030, one or more mismatches are detected, then the destination verification module records a list of mismatches in a verify log in step 1035 before displaying a report to the administrator in step 1040. Such a verify log may be utilized in the above-described procedure 800 to perform a repair of the file system at a later point in time. The procedure then completes in step 1045.

The foregoing description has been directed to specific embodiments of this invention. It will be apparent, however, that other variations and modifications may be made to the described embodiments, but the attainment of some or all of their advantages. For instance, it is expressly contemplated that the teachings of this invention can be implemented as software, including a computer-readable medium having program instructions executing on a computer, hardware, firmware, or a combination thereof. Accordingly, this description is to be taken by way of example of and not to otherwise limit the scope of the invention. Therefore, it is the object of the appended claims to cover all such variations and modifications as come within the true spirit and scope of the invention.

What is claimed is:

1. A method for verifying that first and second data sets are consistent comprising:
   identifying, by a processor, a common instantiation of the first and second data sets, the first data set associated with a source verification module and the second data set associated with a destination verification module;
   utilizing the identified common instantiation to perform a verification process between the source verification module and the destination verification module, wherein the source verification module and the destination verification module perform the verification process using a plurality of different modes, the plurality of different modes including a first mode, a second mode, and a third mode,
      wherein the first mode performs a combined verification and repair procedure, the second mode performs only a verification procedure, and the third mode operates in combination with either the first mode or the second mode to send checksum information over a network in place of complete data blocks;
   sending, from a source computer hosting the first data set, a data stream associated with the first data set to a destination computer hosting the second data set;
   comparing, at the destination computer, the received data stream with the second data set; and
   in response to detecting one or more data inconsistencies between the received data stream and the second data set, generating, by the processor, a verify log configured to record the one or more data inconsistencies on a persistent storage device, the verify log utilized by the destination computer to notify an administrator of the inconsistencies.

2. The method of claim 1 wherein the data stream comprises all blocks of data in the first data set.

3. The method of claim 1 wherein the data stream comprises checksum information associated with the first data set.

4. The method of claim 1 further comprising:
   sending the verify log to the source computer hosting the first data set; and
   sending, from the source computer hosting the first data set, a data stream comprising blocks identified in the verify log.

5. The method of claim 4 further comprising updating the second data set using the blocks identified in the verify log.

6. The method of claim 1 wherein the first and second data sets comprise file systems.

7. The method of claim 1 wherein the first and second data sets comprise persistent consistency point images.

8. A computer readable medium, including program instructions executing on a computer, for verifying that first and second data sets are consistent, the computer readable medium including instructions for performing:
   identifying, by a processor, a common instantiation of the first and second data sets, the first data set associated with a source verification module and the second data set associated with a destination verification module;
   utilizing the identified common instantiation to perform a verification process between the source verification module and the destination verification module, wherein the source verification module and the destination verification module perform the verification process using a plurality of different modes, the plurality of different modes including a first mode, a second mode, and a third mode,
      wherein the first mode performs a combined verification and repair procedure, the second mode performs only a verification procedure, and the third mode operates in combination with either the first mode or the second mode to send checksum information over a network in place of complete data blocks;
   sending, from a source computer hosting the first data set, a data stream associated with the first data set to a destination computer hosting the second data set;
   comparing, at the destination computer, the data stream with the second data set; and
   in response to detecting one or more data inconsistencies between the received data stream and the second data set, generating, by the processor, a verify log configured to record the one or more data inconsistencies on a persistent storage device, the verify log utilized by the destination computer to notify an administrator of the inconsistencies.

9. A system configured to verify that first and second data sets are consistent comprising:
   a source computer serving the first data set and executing a source verification module;
   a destination computer serving the second data set and executing a destination verification module, wherein the destination verification module sends an identifier of a common instantiation of the first and second data sets to the source verification module; and
   wherein the source verification module transmits a data stream associated with the identified instantiation of the first data set to the destination verification module, and wherein the destination verification module:
      compares the data stream with the second data set, and
      in response to one or more data inconsistencies between the data stream and the second data set, generates a verify log configured to record the one or more data inconsistencies on a persistent storage device, the verify log utilized by the destination computer to notify an administrator of the inconsistencies; and
   wherein the source verification module and the destination verification module perform a verification process using a plurality of different modes, the plurality of different modes including a first mode, a second mode, and a third mode,
      wherein the first mode performs a combined verification and repair procedure, the second mode performs only a verification procedure, and the third mode operates in combination with either the first mode or the second mode to send checksum information over a network in place of complete data blocks.

10. The system of claim 9 wherein the data stream comprises all blocks of data in the first data set.

11. The system of claim 9 wherein the data stream comprises checksum information associated with the first data set.

12. The system of claim 11 wherein the checksum information comprises RAID checksums.

13. The system of claim 9 wherein the first and second data sets comprise file systems.

14. The system of claim 9 wherein the first and second data sets comprise persistent consistency point images.

15. The system of claim 9 wherein the identified instantiation of the first data set comprises a persistent consistency point image.

16. A system comprising:
    a source storage system having a first computer with a first processor and one or more persistent consistency point images (PCPIs);
    a destination storage system having a second computer with a second processor and one or more PCPIs, the source storage system having a first PCPI, the destination storage system having a second PCPI, where the first and second PCPIs are in common with each other;
    a source verification module executing on the source storage system, the source verification module configured to transmit the first PCPI to the destination storage system; and
    a destination verification module executing on the destination storage system, the destination verification module configured to:
        compare the first and second PCPIs;
        in response to detecting one or more inconsistencies between the first and second PCPIs, update the destination storage system to render the second PCPI consistent with the first PCPI and generate a verify log configured to record the one or more data inconsistencies on a persistent storage device, the verify log utilized by the destination computer to notify an administrator of the inconsistencies; and
    wherein the source verification module and the destination verification module perform a verification process using a plurality of different modes, the plurality of different modes including a first mode, a second mode, and a third mode,
        wherein the first mode performs a combined verification and repair procedure, the second mode performs only a verification procedure, and the third mode operates in combination with either the first mode or the second mode to send checksum information over a network in place of complete data blocks.

17. The system of claim 16 further comprising:
    a baseline PCPI of the source storage system, the source storage system further configured to transmit the baseline PCPI to the destination storage system;
    a next PCPI of the source storage system, the next PCPI generated by the source storage system after the destination storage system has received the baseline PCPI; and
    a mirroring application module of the source storage system, the mirroring application module configured to determine one or more changes between the baseline PCPI and the next PCPI and transmit only the one or more changes to the destination storage system.

18. The system of claim 17 wherein the destination storage system is further configured to receive the changes and generate a next PCPI such that the baseline and next PCPIs on both the source storage system and the destination storage system are identical.

19. The system of claim 16 further comprising:
    a verification module for verifying the consistency of the source storage system and the destination storage system; and
    an administrator configured to invoke the verification module.

20. The system of claim 19 wherein the verification module is automatically invoked.

21. A method comprising:
    determining, by a source and destination storage system, a most recent persistent consistency point image (PCPI) common to both the source and the destination storage system, the source storage system having a first PCPI, the destination storage system having a second PCPI, where the first and second PCPIs are in common with each other, the first PCPI associated with a source verification module and the second PCPI associated with a destination verification module;
    utilizing the identified most recent PCPI to perform a verification process between the source verification module and the destination verification module wherein the source verification module and the destination verification module perform the verification process using a plurality of different modes, the plurality of different modes including a first mode, a second mode, and a third mode,
        wherein the first mode performs a combined verification and repair procedure, the second mode performs only a verification procedure, and the third mode operates in combination with either the first mode or the second mode to send checksum information over a network in place of complete data blocks;
    transmitting the first PCPI to the destination storage system;
    receiving the first PCPI at the destination storage system;
    comparing the first PCPI with the second PCPI; and
    in response to one or more data mismatches between the first and second PCPIs, correcting, by the destination storage system, the second PCPI so that the first and second PCPIs are consistent and generate a verify log configured to record the one or more data inconsistencies on a persistent storage device, the verify log utilized by the destination computer to notify an administrator of the inconsistencies.

22. The method of claim 21 further comprising:
    transmitting, to the destination storage system, one or more additional PCPIs of the source storage system, the one or more additional PCPIs of the source storage system older than first and second PCPIs;
    receiving the one or more additional PCPIs of the source storage system at the destination storage system;
    comparing each of the one or more additional PCPIs of the source storage system with an additional PCPI of the destination storage system; and
    in response to one or more data mismatches between at least one of the one or more additional PCPIs of the source storage system and at least one additional PCPI of the destination storage system, correcting, by the destination storage system one or more additional PCPIs of the destination storage system so that the additional PCPIs of the source and destination storage systems are consistent.

23. The method of claim 22 further comprising transmitting, to the destination storage system, a data stream, the data stream comprising the first PCPI and the one or more additional PCPIs of the source storage system.

24. The method of claim 1 wherein the common instantiation of the first and second data sets comprises a most recent persistent consistency point image common to both the first data set and the second data set.

25. A method comprising:
    identifying a most recent persistent consistency point image (PCPI) common to both a source storage system and a destination storage system, a first PCPI associated with a source verification module and a second PCPI associated with a destination verification module;

utilizing the identified most recent PCPI to perform a verification process between the source verification module and the destination verification module wherein the source verification module and the destination verification module perform the verification process using a plurality of different modes, the plurality of different modes including a first mode, a second mode, and a third mode, wherein the first mode performs a combined verification and repair procedure, the second mode performs only a verification procedure, and the third mode operates in combination with either the first mode or the second mode to send checksum information over a network in place of complete data blocks;

transmitting a data stream from the source storage system to the destination storage system, the data stream comprising data blocks of a source storage system version of the identified most recent PCPI common to the source and destination storage systems;

receiving the data stream at the destination storage system;

performing, by the destination storage system, a verification procedure to identify one or more data mismatches between the data blocks of the data stream and data blocks of the destination storage system; and in response to identifying one or more data mismatches, generating, by the destination storage system, a verify log of the one or more data mismatches, the verify log utilized by the destination computer to notify an administrator of the data mismatches.

26. The method of claim 25 wherein the verification procedure comprises comparing the data blocks of the data stream with data blocks of a destination storage system version of the identified most recent PCPI common to the source and destination storage systems.

27. The method of claim 26 wherein data blocks are compared on a byte-by-byte basis.

28. The method of claim 25 wherein the data stream further comprises data blocks of any PCPI of the source storage system older than the identified most recent PCPI common to the source and destination storage systems.

29. The method of claim 25 wherein the data stream further comprises a list of one or more PCPIs with which the data blocks of the data stream are associated.

30. The method of claim 29 further comprising recording the list of one or more PCPIs with which the data blocks of the data stream are associated in the verify log.

31. The method of claim 25 further comprising, in response to an initiation by an administrator, utilizing the verify log to perform a repair procedure.

32. The method of claim 31 wherein the repair procedure comprises updating the data blocks of the destination storage system to render the data blocks of the source and destination storage systems consistent.

33. The method of claim 31 wherein the initiation is configured to occur automatically.

34. The method of claim 25 wherein the verification log comprises a list of one or more block numbers in which the one or more data mismatches occurred.

35. A system comprising:
a source storage system having a first computer with a source processor and one or more persistent consistency point images (PCPIs);
a destination storage system having a second computer with a destination processor and one or more PCPIs, the source storage system and the destination storage system having in common a most recent PCPI of the one or more PCPIs of the source and destination storage systems;

a source verification module executing on the source storage system, the source verification module configured to transmit a data stream from the source storage system to the destination storage system, the data stream comprising data blocks of a source storage system version of the identified most recent PCPI common to the source and destination storage systems; and a destination verification module executing on the destination storage system, the destination verification module configured to:

perform a verification procedure to identify one or more data mismatches between the data blocks of the data stream and data blocks of the destination storage system;

in response to identifying one or more data mismatches, generate a verify log of the one or more data mismatches, the verify log utilized by the destination computer to notify an administrator of the mismatches; and wherein the source verification module and the destination verification module perform a verification process using a plurality of different modes, the plurality of different modes including a first mode, a second mode, and a third mode, wherein the first mode performs a combined verification and repair procedure, the second mode performs only a verification procedure, and the third mode operates in combination with either the first mode or the second mode to send checksum information over a network in place of complete data blocks.

36. A method comprising:
identifying a most recent persistent consistency point image (PCPI) common to both a source storage system and a destination storage system, a first PCPI associated with a source verification module and a second PCPI associated with a destination verification module;

utilizing the identified most recent PCPI to perform a verification process between the source verification module and the destination verification module wherein the source verification module and the destination verification module perform the verification process using a plurality of different modes, the plurality of different modes including a first mode, a second mode, and a third mode, wherein the first mode performs a combined verification and repair procedure, the second mode performs only a verification procedure, and the third mode operates in combination with either the first mode or the second mode to send checksum information over a network in place of complete data blocks;

transmitting a data stream from the source storage system to the destination storage system, the data stream comprising checksums of data blocks of a source storage system version of the identified most recent PCPI common to the source and destination storage systems;

receiving the data stream at the destination storage system;

performing, by the destination storage system, a verification procedure to identify one or more data mismatches between the checksums of the data stream and checksums of data blocks of the destination storage system; and in response to identifying one or more data mismatches, generating, by the destination storage system, a verify log of the one or more data mismatches, the verify log utilized by the destination computer to notify an administrator of the mismatches.

37. A system comprising:

a source storage system having a first computer with a first processor and one or more persistent consistency point images (PCPIs);

a destination storage system having a second computer with a second processor and one or more PCPIs, the source storage system and the destination storage system having in common a most recent PCPI of the one or more PCPIs of the source and destination storage systems;

a source verification module executing on the source storage system, the source verification module configured to transmit a data stream from the source storage system to the destination storage system, the data stream comprising checksums of data blocks of a source storage system version of the identified most recent PCPI common to the source and destination storage systems; and a destination verification module executing on the destination storage system, the destination verification module configured to:

perform a verification procedure to identify one or more data mismatches between the checksums of the data stream and checksums of data blocks of the destination storage system;

in response to identifying one or more data mismatches, generate a verify log of the one or more data mismatches, the verify log utilized by the destination computer to notify an administrator of the mismatches wherein the source verification module and the destination verification module perform a verification process using a plurality of different modes, the plurality of different modes including a first mode, a second mode, and a third mode, wherein the first mode performs a combined verification and repair procedure, the second mode performs only a verification procedure, and the third mode operates in combination with either the first mode or the second mode to send checksum information over a network in place of complete data blocks.

* * * * *